(12) United States Patent
Minagata

(10) Patent No.: US 9,979,044 B2
(45) Date of Patent: May 22, 2018

(54) POWER STORAGE APPARATUS AND VEHICLE WITH POWER STORAGE APPARATUS MOUNTED THEREON

(71) Applicant: KABUSHIKI KAISHA TOYOTA JIDOSHOKKI, Kariya-shi, Aichi-ken (JP)

(72) Inventor: Atsushi Minagata, Kariya (JP)

(73) Assignee: KABUSHIKI KAISHA TOYOTA JIDOSHOKKI, Kariya-Shi, Aichi-Ken (JP)

( * ) Notice: Subject to any disclaimer, the term of this patent is extended or adjusted under 35 U.S.C. 154(b) by 400 days.

(21) Appl. No.: 14/380,317

(22) PCT Filed: Feb. 12, 2013

(86) PCT No.: PCT/JP2013/053251
§ 371 (c)(1),
(2) Date: Aug. 21, 2014

(87) PCT Pub. No.: WO2013/129091
PCT Pub. Date: Sep. 6, 2013

(65) Prior Publication Data
US 2015/0017517 A1    Jan. 15, 2015

(30) Foreign Application Priority Data
Feb. 27, 2012    (JP) .................................. 2012-040377

(51) Int. Cl.
*H01M 10/04*    (2006.01)
*H01G 11/72*    (2013.01)
(Continued)

(52) U.S. Cl.
CPC ........ *H01M 10/0413* (2013.01); *H01G 11/72* (2013.01); *H01G 11/76* (2013.01);
(Continued)

(58) Field of Classification Search
CPC combination set(s) only.
See application file for complete search history.

(56) References Cited

U.S. PATENT DOCUMENTS 5,580,676 A * 12/1996 Honda .................... H01M 2/18
429/128
6,596,432 B2 * 7/2003 Kawakami .............. H01M 4/02
429/208

(Continued)

FOREIGN PATENT DOCUMENTS

| CN | 101425600 A | 5/2009 |
| JP | 08-096839 A | 4/1996 |

(Continued)

OTHER PUBLICATIONS

International Preliminary Report on Patentability dated Sep. 2, 2014 from the International Searching Authority in application No. PCT/JP2013/053251.

(Continued)

*Primary Examiner* — Jeremiah R Smith
(74) *Attorney, Agent, or Firm* — Sughrue Mion, PLLC

(57) ABSTRACT

A power storage device includes an electrode assembly formed by stacking a positive electrode sheet, a negative electrode sheet, and a sheet-like separator arranged between the positive and negative electrode sheets. The positive electrode sheet includes a positive electrode thin metal plate, which includes a first positive electrode edge and a second positive electrode edge. A surface of the positive electrode sheet includes a positive electrode application region and a positive electrode non-application region. The negative electrode sheet includes a negative electrode thin metal plate including a first negative electrode edge and a second negative electrode edge. A positive electrode border, which is a border between the positive electrode application region and the positive electrode non-application region, is located between the first positive electrode edge and the second positive electrode edge. The positive electrode border is (Continued)

located between the first negative electrode edge and the second negative electrode edge.

14 Claims, 3 Drawing Sheets

(51) Int. Cl.
    *H01G 11/76*      (2013.01)
    *H01M 4/02*      (2006.01)
    *H01G 11/82*      (2013.01)
    *H01G 11/22*      (2013.01)
    *H01M 2/26*      (2006.01)

(52) U.S. Cl.
    CPC .............. *H01G 11/82* (2013.01); *H01M 4/02* (2013.01); *H01M 10/0431* (2013.01); *H01G 11/22* (2013.01); *H01M 2/26* (2013.01); *H01M 10/04* (2013.01); *H01M 2220/20* (2013.01); *Y02E 60/13* (2013.01)

(56) References Cited

U.S. PATENT DOCUMENTS

| | | | |
|---|---|---|---|
| 6,599,333 B1* | 7/2003 | Kim | H01M 6/164 29/623.2 |
| 2009/0117456 A1 | 5/2009 | Hosaka et al. | |
| 2010/0081052 A1* | 4/2010 | Morishima | H01M 2/263 429/211 |
| 2010/0221587 A1 | 9/2010 | Yanagita et al. | |
| 2011/0135998 A1* | 6/2011 | Ahn | H01M 2/266 429/163 |
| 2011/0236764 A1* | 9/2011 | Takita | B01D 67/0027 429/249 |
| 2012/0028092 A1* | 2/2012 | Nunome | H01M 2/18 429/94 |

FOREIGN PATENT DOCUMENTS

| | | |
|---|---|---|
| JP | 2003-242969 A | 8/2003 |
| JP | 2007-095656 A | 4/2007 |
| JP | 2009-158693 A | 7/2009 |
| JP | 2010-080392 A | 4/2010 |
| JP | 2011-119262 A | 6/2011 |
| JP | 2012-28061 A | 2/2012 |

OTHER PUBLICATIONS

International Search Report, PCT/JP2013/053251 dated Apr. 16, 2013 [PCT/ISA/210].

* cited by examiner

POWER STORAGE APPARATUS AND VEHICLE WITH POWER STORAGE APPARATUS MOUNTED THEREON

CROSS REFERENCE TO RELATED APPLICATIONS

This application is a National Stage of Application No. PCT/JP2013/053251 filed Feb. 12, 2013, claiming priority based on Japanese Patent Application No. 2012-040377 filed Feb. 27, 2012, the contents of all of which are incorporated herein by reference in their entirety.

FIELD OF THE INVENTION

The present invention relates to a power storage device and a vehicle in which the power storage device is installed.

BACKGROUND OF THE INVENTION

In the prior art, a lithium-ion rechargeable battery and a nickel-metal hydride rechargeable battery are each known as a rechargeable battery that is a type of a power storage device. For example, in a lithium-ion rechargeable battery, an electrode assembly, which is formed by stacking or winding positive electrode sheets and negative electrode sheets, is accommodated in a case. In the electrode assembly, the positive electrode sheets and the negative electrode sheets form a layered structure. The positive electrode sheets and the negative electrode sheets each include a thin metal plate. An electrode tab extends from one edge of the thin metal plate. For example, refer to patent document 1.

In a rechargeable battery described in patent document 1, in each electrode sheet, an active material layer is formed on a surface of a thin metal plate although an active material layer is not formed on an electrode tab. The electrode tab is electrically connected to an external terminal (electrode terminal), which is formed outside a case, by a current collection terminal (current collection member). In the rechargeable battery described in patent document 1, the positive electrode sheets are smaller than the negative electrode sheets. This limits decreases in the battery capacity caused by an imbalance in the size of regions (electrode sheet) where the active material layers are formed.

PRIOR ART DOCUMENT

Patent Document

Patent Document 1: Japanese Laid-Open Patent Publication No. 8-96839

SUMMARY OF THE INVENTION

In general, the active material layer is formed by applying a paste of an active material agent, which is a mixture of an active material, a conductive agent, and a binder, to the surface of a thin metal plate. Under this condition, it is difficult to consistently form the active material layer in a fixed region. This often causes processing errors in the formation region (formation location) of the active material layer.

Thus, for example, in a positive electrode sheet, the processing error may cause the active material layer to be formed on the electrode tab. In such a case, unnecessary active material would be over-applied sideward from the positive electrode tab. Further, in this case, the positive active material layer formed on the positive electrode tab is included in the negative active material layer as viewed from the stacking direction of the electrode sheets in the electrode assembly. Thus, the negative electrode sheets (thin metal plates) need to be enlarged.

When such a structure is employed, the positive active material layer (thin metal plate) is not formed beside the positive electrode tab from the beginning. Therefore, in each negative electrode sheet, a portion corresponding to a location beside the positive electrode tab is substantially irrelevant to improving the battery capacity. This may decrease the energy density of the power storage device.

It is an object of the present invention to provide a power storage device that improves the usage rate of the active material and improves the energy density and a vehicle to which the power storage device is installed.

To achieve the above object, the first aspect of the present invention includes a positive electrode sheet including a positive electrode thin metal plate, which includes a first positive electrode edge and a second positive electrode edge located at an opposite side of the first positive electrode edge, and a positive electrode tab, which extends from the first positive electrode edge, a positive current collection member connected to the positive electrode tab to be electrically connected to the positive electrode thin metal plate, a negative electrode sheet including a negative electrode thin metal plate, which includes a first negative electrode edge and a second negative electrode edge located at an opposite side of the first negative electrode edge, and a negative electrode tab, which extends from the first negative electrode edge, a negative current collection member connected to the negative electrode tab to be electrically connected to the negative electrode thin metal plate, a sheet-like separator arranged between the positive electrode sheet and the negative electrode sheet to insulate the positive electrode sheet and the negative electrode sheet from each other, an electrode assembly formed by stacking the positive electrode sheet, the negative electrode sheet, and the separator, and a case accommodating the electrode assembly. A surface of the positive electrode sheet includes a positive electrode application region, which includes the second positive electrode edge and to which a positive active material is applied. The surface of the positive electrode sheet includes a positive electrode non-application region, to which the positive active material is not applied. A positive electrode border, which is a border between the positive electrode application region and the positive electrode non-application region, is located between the first positive electrode edge and the second positive electrode edge. A surface of the negative electrode sheet includes a negative electrode application region, which includes the second negative electrode edge and to which a negative active material is applied. The surface of the negative electrode sheet includes a negative electrode non-application region, to which the negative active material is not applied. A negative electrode border, which is a border between the negative electrode application region and the negative electrode non-application region, is located between the first negative electrode edge and a distal portion of the negative electrode tab. The first negative electrode edge and the first positive electrode edge are located on the same side of the electrode assembly. The positive electrode border is located between the first negative electrode edge and the second negative electrode edge.

The second aspect of the present invention is to provide a vehicle to which a power storage device of the first aspect is installed.

In each of the above aspects, the positive electrode tab extends from the first positive electrode edge of the positive electrode sheet. A surface of the positive electrode sheet includes the positive electrode application region that includes the second positive electrode edge, which is located on the opposite side of the first positive electrode edge. Further, the positive active material is applied to the positive electrode application region. The positive electrode sheet includes the positive electrode border, which is a border between the positive electrode application region and a positive electrode non-application region, to which the positive active material is not applied. The positive electrode border is located between the first positive electrode edge and the second positive electrode edge. Thus, the positive electrode non-application region is formed in the positive electrode tab and a portion of the positive electrode thin metal plate that is adjacent to the first positive electrode edge. This reduces unnecessary positive active material over-applied beside the positive electrode tab. Consequently, this saves the positive active material and improves the usage rate of the active material. The negative electrode sheet includes the negative electrode border, which is a border between the negative electrode application region to which the negative active material is applied and the negative electrode non-application region to which the negative active material is not applied. The negative electrode border is located between the first negative electrode edge, from which the negative electrode tab extends, and the distal portion of the negative electrode tab. Here, the positive electrode border is located between the first negative electrode edge and the second negative electrode edge, which is located at an opposite side of the first negative electrode edge. This allows the first negative electrode edge of the negative electrode sheet to approach the positive electrode border of the positive electrode sheet within a range in which the first negative electrode edge of the negative electrode sheet is not located toward the second negative electrode sheet from the positive electrode border of the positive electrode sheet. Accordingly, the thin metal plate used to form the negative electrode sheet may be reduced in size, and the energy density may be improved.

DETAILED DESCRIPTION OF THE PREFERRED EMBODIMENTS

One embodiment of the present invention will now be described with reference to FIGS. 1 to 3(b).

Figure 1:
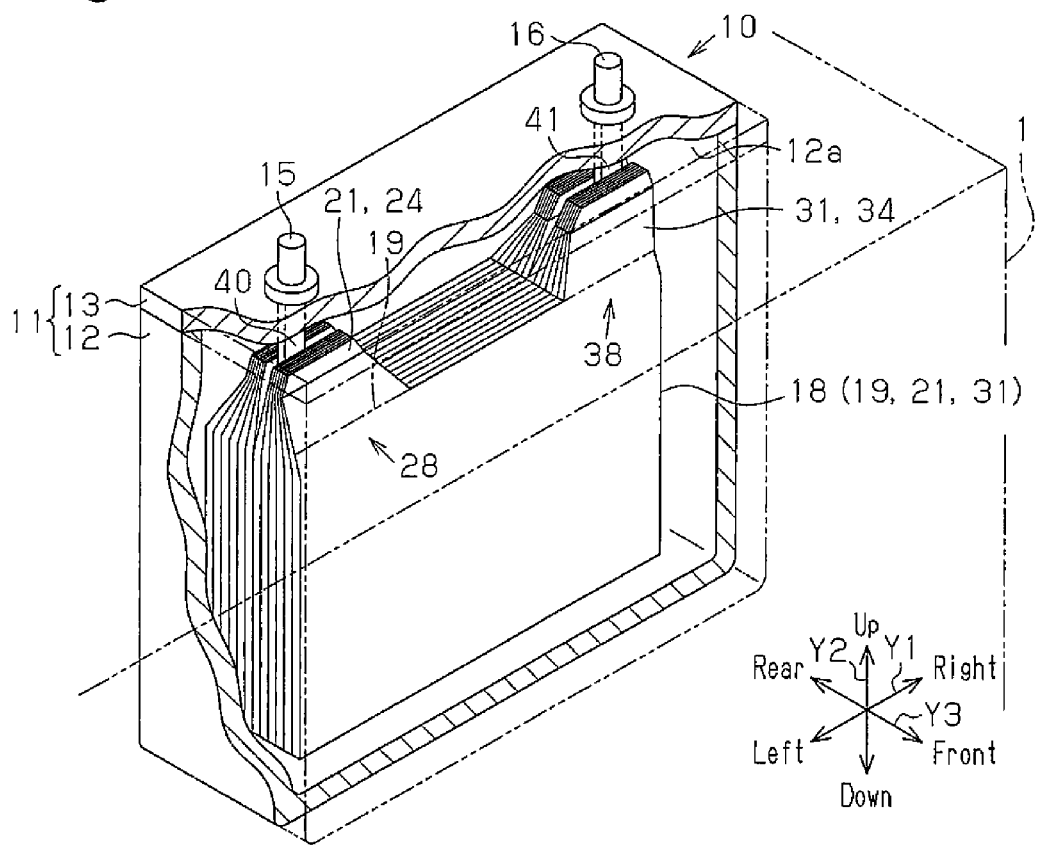
FIG. 1 is a schematic perspective view of a rechargeable battery according to one embodiment.

As shown in FIG. 1, a rechargeable battery 10, which serves as a power storage device, is installed in a vehicle such as an industrial vehicle or a passenger vehicle. The rechargeable battery 10 includes a case 11, which has a generally cuboid shape and has a low profile as a whole. The case 11 includes a main body member 12, which is tubular and includes a closed end (tetragonal tube in the present embodiment), and a plate-like (tetragonal plate-like in the present embodiment) cover member 13. The cover member 13 is coupled to the main body member 12 to seal an opening 12a of the main body member 12. The main body member 12 and the cover member 13 are each formed from a metal (for example, stainless steel or aluminum). Hereinafter, in the present description, the longitudinal direction of the case 11 indicated by arrow Y1 is defined as a left-right direction or a lateral direction. The heightwise direction of the case 11 indicated by arrow Y2 is defined as an up-down direction or a vertical direction. The direction parallel to the short sides of the case 11 indicated by arrow Y3 in FIG. 3 is defined as a front-rear direction.

A generally cylindrical positive terminal 15 and negative terminal 16 protrude from an outer surface (upper surface) of the cover member 13. The positive terminal 15 and the negative terminal 16 are insulated from the case 11 (main body member 12 and cover member 13).

Figure 2:
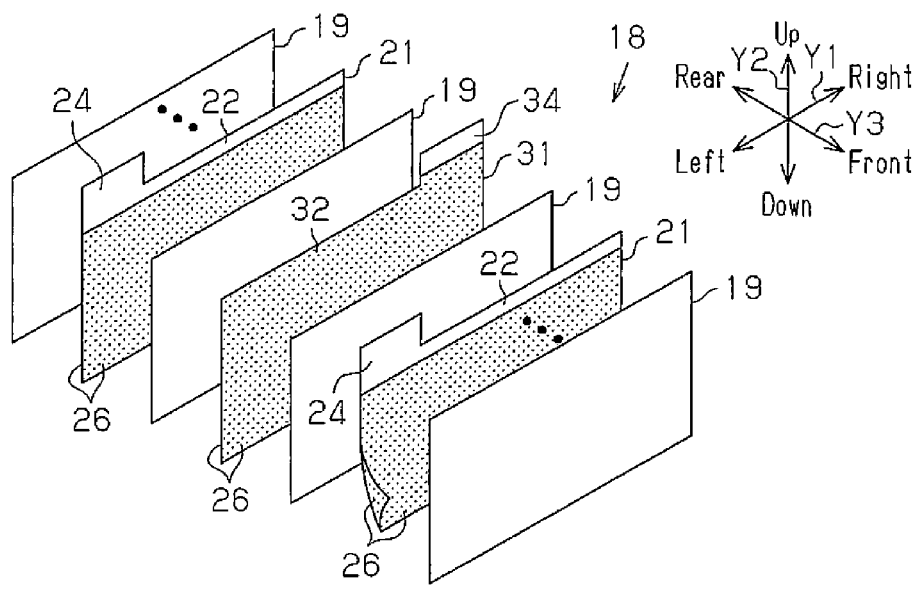
FIG. 2 is a schematic exploded perspective view of an electrode assembly.

As shown in FIGS. 1 and 2, an electrode assembly 18, which forms a generally cuboid shape and has a low profile as a whole in the lateral direction, is accommodated in the case 11 (main body member 12). The electrode assembly 18 includes a plurality of positive electrode sheets 21, a plurality of negative electrode sheets 31, and a plurality of separators 19 (partition) each of which is arranged between a positive electrode sheet 21 and a negative electrode sheet 31. The electrode assembly 18 has a layered structure in which the positive electrode sheets 21, the negative electrode sheets 31, and the separators 19 are stacked. Each separator 19 electrically insulates the adjacent positive electrode sheet 21 and negative electrode sheet 31 from each other. The electrode assembly 18, which is covered with an insulation bag that is formed from an insulation material and not shown in the drawings, is accommodated in the case 11. The case 11 is filled with an electrolyte (electrolytic solution) in accordance with the type of the rechargeable battery 10, for example, a lithium-ion rechargeable battery or a nickel-metal hydride rechargeable battery.

As shown in FIG. 2, the positive electrode sheet 21 includes a positive electrode metal foil 22, which serves as a tetragonal sheet-like positive electrode thin metal plate. The negative electrode sheet 31 includes a negative electrode metal foil 32, which serves as a tetragonal sheet-like negative electrode thin metal plate. Each of the positive electrode metal foil 22 and the negative electrode metal foil 32 is a metal selected in accordance with the type of the rechargeable battery 10, for example, a lithium-ion rechargeable battery or a nickel-metal hydride rechargeable battery. Each of the positive electrode metal foil 22 of the positive electrode sheet 21 and the negative electrode metal foil 32 of the negative electrode sheet 31 is formed from a different type of metal. In the present embodiment, the positive electrode metal foil 22 is formed from, for example, aluminum, and the negative electrode metal foil 32 is formed from, for example, copper.

Figure 3A:
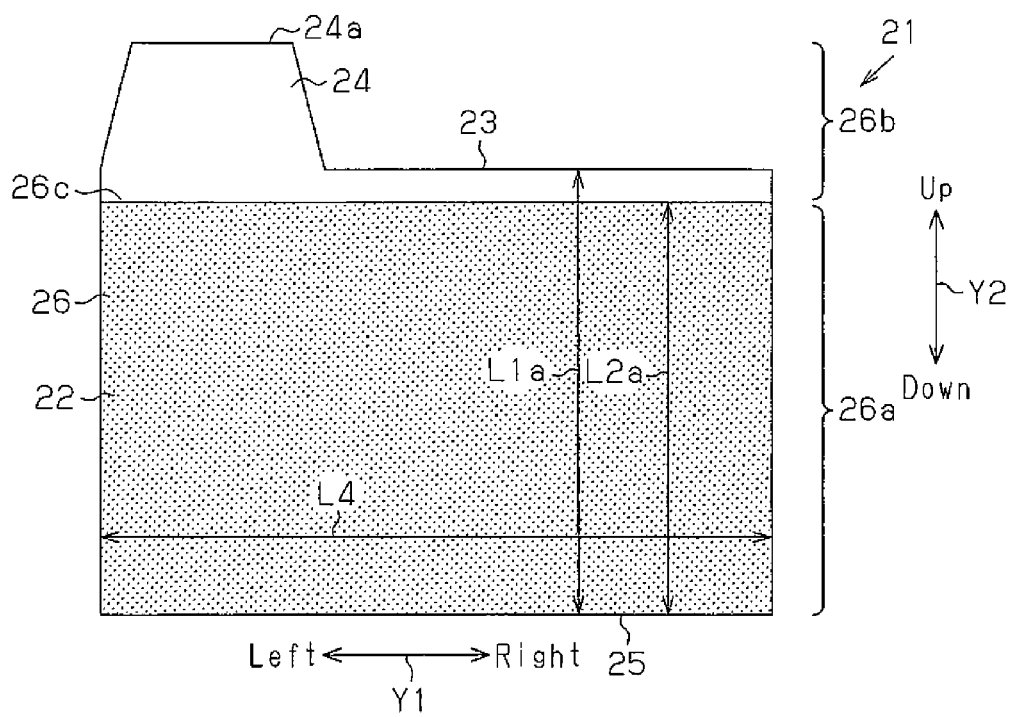
FIG. 3(a) is a front view of a positive electrode sheet.

As shown in FIG. 3(a), the positive electrode sheet 21 includes a trapezoidal (generally tetragonal) positive electrode tab 24 that upwardly extends from a positive electrode upper edge 23, which is an upper edge of the positive electrode metal foil 22. The positive electrode tab 24 of the present embodiment is integrated with the positive electrode metal foil 22 in the positive electrode sheet 21. The positive electrode tab 24 is located on the left end of the positive electrode upper edge 23. In the present embodiment, an upward direction with respect to the vertical direction, which is indicated by the arrow Y2, is the direction in which the positive electrode tab 24 extends. The positive electrode upper edge 23 that includes the basal portion of the positive electrode tab 24 corresponds to the first positive electrode edge.

The two surfaces (front surface and rear surface) of the positive electrode sheet 21 each include a positive active material layer 26. The positive active material layer 26 includes a positive electrode lower edge 25, which is located at the opposite side of the positive electrode upper edge 23 in the extending direction of the positive electrode tab 24. The positive active material layer 26 includes the positive active material which extends throughout the entire width in the lateral direction over a constant length (constant height) from the positive electrode lower edge 25. In the present embodiment, the region where the positive active material layer 26 is formed corresponds to the positive electrode application region 26a to which the positive active material is applied.

The two surfaces of the positive electrode sheet 21 each include a positive electrode non-application region 26b, to which the positive active material is not applied, that is, does not include the positive active material layer 26. The positive electrode non-application region 26b entirely includes the positive electrode tab 24 and includes a region that extends throughout the entire width in the lateral direction over a constant length (constant height) from the distal portion 24a of the positive electrode tab 24. The positive electrode non-application region 26b extends over the entire positive electrode tab 24 and in the vicinity of the positive electrode upper edge 23. The two surfaces of the positive electrode sheet 21 each include a positive electrode border 26c, which is a border between the positive electrode application region 26a and the positive electrode non-application region 26b. In the present embodiment, the positive electrode lower edge 25 corresponds to the second positive electrode edge.

In the positive electrode sheet 21, the length L1a (height of the positive electrode metal foil 22) from the positive electrode lower edge 25 to the positive electrode upper edge 23, is greater than the length L2a (height of the positive electrode application region 26a) from the positive electrode lower edge 25 to the positive electrode border 26c. In the positive electrode sheet 21 of the present embodiment, the positive electrode upper edge 23 and the positive electrode lower edge 25 are generally parallel to the positive electrode border 26c.

Accordingly, in the positive electrode sheet 21, the positive electrode non-application region 26b extends along the positive electrode upper edge 23 of the positive electrode metal foil 22. The positive electrode tab 24 does not include the positive active material layer 26. That is, in the positive electrode metal foil 22, the positive electrode border 26c is located between the positive electrode upper edge 23 and the positive electrode lower edge 25.

Figure 3B:
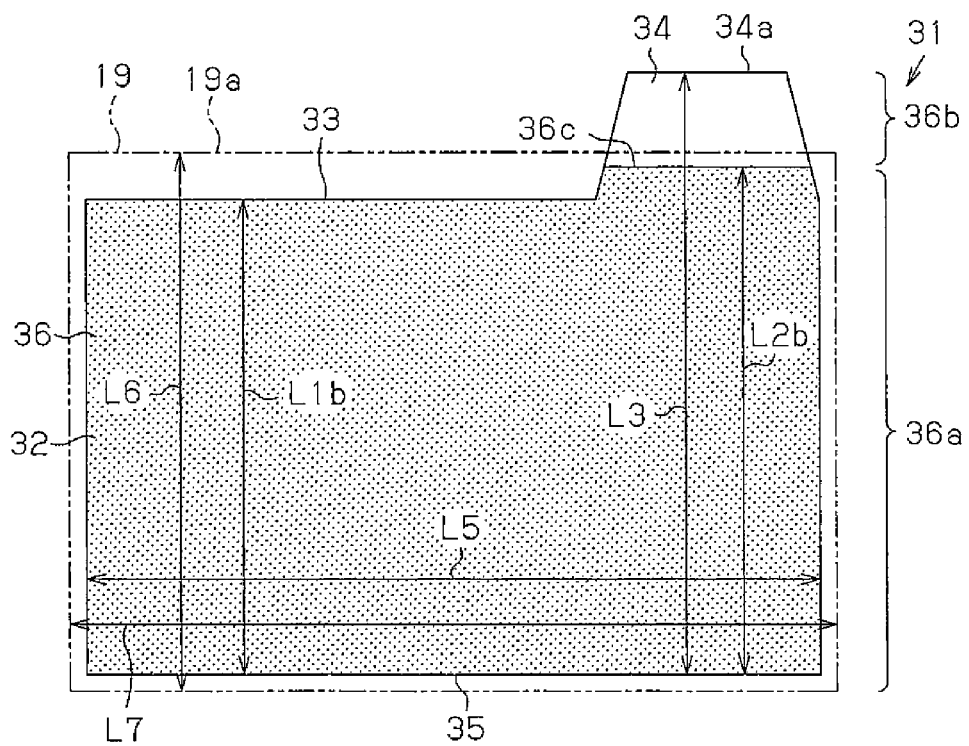
FIG. 3(b) is a front view of a negative electrode sheet.

As shown in FIG. 3(b), the negative electrode sheet 31 includes a trapezoidal (generally tetragonal) negative electrode tab 34 that upwardly extends from a negative electrode upper edge 33, which is an upper edge of the negative electrode metal foil 32 of the negative electrode sheet 31. The negative electrode tab 34 of the present embodiment is integrated with the negative electrode metal foil 32 in the negative electrode sheet 31. The negative electrode tab 34 is located on the right end of the negative electrode upper edge 33. In the present embodiment, an upward direction with respect to the vertical direction, which is indicated by the arrow Y2, is a direction in which the negative electrode tab 34 extends. The negative electrode upper edge 33 that includes the basal portion of the negative electrode tab 34 corresponds to the first negative electrode edge.

The two surfaces (front surface and rear surface) of the negative electrode sheet 31 each include a negative active material layer 36. The negative active material layer 36 includes the negative active material that extends throughout the entire width in the lateral direction over a constant length (constant height) from a negative electrode lower edge 35, which is located at the opposite side of the negative electrode upper edge 33 in the extending direction of the negative electrode tab 34. In the present embodiment, a region where the negative active material layer 36 is formed corresponds to the negative electrode application region 36a to which the positive active material is applied.

The two surfaces of the negative electrode sheet 31 each include a negative electrode non-application region 36b, to which the negative active material is not applied, that is, does not include the negative active material layer 36. The negative electrode non-application region 36b extends, in the negative electrode tab 34, throughout the entire width in the lateral direction over a constant length (constant height) from the distal portion 34a. The negative electrode non-application region 36b includes a portion of the negative electrode tab 34 including the distal portion 34a of the negative electrode tab 34. The two surfaces of the negative electrode sheet 31 each include a negative electrode border 36c, which is a border between the negative electrode application region 36a and the negative electrode non-application region 36b. In the present embodiment, the negative electrode lower edge 35 corresponds to a second negative electrode edge.

In the negative electrode sheet 31, the length L1b (height of the negative electrode metal foil 32) from the negative electrode lower edge 35 to the negative electrode upper edge 33 is less than the length L2b (height of the negative electrode application region 36a) from the negative electrode lower edge 35 to the negative electrode border 36c. In addition, in the negative electrode sheet 31, the length L2b from the negative electrode lower edge 35 to the negative electrode border 36c is less than the length L3 (height of the negative electrode sheet 31) from the negative electrode lower edge 35 to the distal portion 34a of the negative electrode tab 34. In the negative electrode sheet 31 of the present embodiment, the negative electrode upper edge 33 and the negative electrode lower edge 35 are generally parallel to the negative electrode border 36c.

Accordingly, the negative electrode sheet 31 includes the negative active material layer 36 throughout each of the two surfaces of the negative electrode metal foil 32. Part of the basal portion of the negative electrode tab 34 includes the negative active material layer 36. However, the distal portion 34a does not include the negative active material layer 36. That is, the negative electrode border 36c is located between the negative electrode upper edge 33 and the distal portion 34a of the negative electrode tab 34.

As shown in FIGS. 3(a) and 3(b), the length L4 of the positive electrode sheet 21 in a direction orthogonal to the extending direction of the positive electrode tab 24 (lateral direction) is less than the length L5 of the negative electrode sheet 31 in a direction (lateral direction) orthogonal to the extending direction of the negative electrode tab 34. In addition, the length L1b from the negative electrode lower edge 35 to the negative electrode upper edge 33 in the negative electrode sheet 31 is greater than the length L1a from the positive electrode lower edge 25 to the positive electrode upper edge 23 in the positive electrode sheet 21. The negative electrode sheet 31 is arranged in such a manner that the negative electrode upper edge 33 upwardly protrudes from the positive electrode upper edge 23.

In addition, the length L1b from the negative electrode lower edge 35 to the negative electrode upper edge 33 in the negative electrode sheet 31 is greater than the length L2a from the positive electrode lower edge 25 to the positive electrode border 26c in the positive electrode sheet 21. Here, the length L1a from the positive electrode lower edge 25 to the positive electrode upper edge 23 in the positive electrode sheet 21 is less than the length L2b from the negative electrode lower edge 35 to the negative electrode border 36c in the negative electrode sheet 31.

The separator 19, which is formed from an insulative resin material, is a tetragonal porous sheet having an extremely fine porous structure. As shown in FIG. 3(b), the length L6 (height) of the separator 19 in the perpendicular direction is greater than the length L2b from the negative electrode lower edge 35 to the negative electrode border 36c on the negative electrode sheet 31. In addition, the length L7 of the separator 19 in the lateral direction is greater than the length L5 on the surface of the negative electrode sheet 31 in a direction orthogonal to the extending direction of the negative electrode tab 34 (lateral direction).

As shown in FIG. 2, the electrode assembly 18 is formed in such a manner that the positive electrode sheet 21 and the negative electrode sheet 31, which have the separator 19 located in between, are stacked in the front-rear direction (thickness direction). More specifically, in the electrode assembly 18, the positive electrode sheets 21 and the negative electrode sheets 31 are alternately arranged by stacking a positive electrode sheet 21, a negative electrode sheet 31, a positive electrode sheet 21, and so on. In the present embodiment, the front-rear direction, which is indicated by the arrow Y3, is the stacking direction of the electrode assembly 18 (positive electrode sheet 21 and negative electrode sheet 31). The negative electrode upper edge 33 from which the negative electrode tab 34 extends in the negative electrode sheet 31 and the positive electrode upper edge 23 from which the positive electrode tab 24 extends in the positive electrode sheet 21 are located at the same side of the electrode assembly 18 (in the present embodiment, upper side where the cover member 13 is located).

Thus, as shown in FIG. 1, in the electrode assembly 18, on the left side of the upper edge, a positive current collector 28 upwardly extends and serves as a current collector (a group of tabs) having a layered structure in which a plurality of the positive electrode tabs 24 are stacked without the separators 19 arranged between the positive electrode tabs 24. Also, in the electrode assembly 18, on the right side of the upper edge, a negative current collector 38 upwardly extends and serves as a current collector (a group of tabs) having a layered structure (layers) in which a plurality of the negative electrode tabs 34 are stacked without the separators 19 arranged between the negative electrode tabs 34.

As shown in FIGS. 3(a) and 3(b), in the electrode assembly 18, the positive electrode border 26c of the positive electrode sheet 21 is located at a position corresponding to between the negative electrode upper edge 33 and the negative electrode lower edge 35.

In the electrode assembly 18, the two lateral edges of the positive electrode sheet 21 are located at the inner sides of the two lateral edges of the negative electrode sheet 31. The positive electrode lower edge 25 of the positive electrode sheet 21 is located upward from the negative electrode lower edge 35 of the negative electrode sheet 31, that is, located toward the positive electrode tab 24 and the negative electrode tab 34 from the negative electrode lower edge 35.

Accordingly, in the electrode assembly 18 of the present embodiment, the positive electrode application region 26a of the positive electrode sheet 21 is entirely included in the negative electrode application region 36a of the negative electrode sheet 31 as viewed from the stacking direction of the electrode assembly 18. More specifically, when viewed from the stacking direction of the electrode assembly 18, the entire positive electrode application region 26a of the positive electrode sheet 21 is included in the negative electrode application region 36a of the negative electrode sheet 31.

Throughout the entire width in the lateral direction in the electrode assembly 18, the upper edge 19a of the separator 19 is located toward the distal portion 24a from the positive electrode upper edge 23 of the positive electrode sheet 21 and also located toward the distal portion 34a from the negative electrode upper edge 33 (negative electrode border 36c) in the negative electrode sheet 31. Here, the upper edge 19a of the separator 19 is the edge in the extending direction of the positive electrode tab 24 and the negative electrode tab 34. In the electrode assembly 18 of the present embodiment, as viewed from the stacking direction in the electrode assembly 18, the positive electrode application region 26a in the positive electrode sheet 21 and the negative electrode application region 36a in the negative electrode sheet 31 are included in the separator 19.

In the present embodiment, the positive electrode sheet 21 may be obtained by punching the positive electrode metal foil 22 in a punching process into the shape described above. Then, a paste of a positive active material agent, which is a mixture of the positive active material, the conductive agent, and the binder, is applied to the positive electrode metal foil 22. This forms the positive active material layer 26. In the same manner, the negative electrode sheet 31 may be obtained by punching the negative electrode metal foil 32 in a punching process into the shape described above. Then, a paste of a negative active material agent, which is a mixture of the negative active material, the conductive agent, and the binder, is applied to the negative electrode metal foil 32. This forms the negative active material layer 36. Additionally, the positive electrode sheet 21 of the present embodiment may be obtained by applying the positive active material mixture to the strip-like (elongated sheet-like) positive electrode metal foil 22 and then punching the positive electrode metal foil 22 in a punching process into the shape described above. In the same manner, the negative electrode sheet 31 of the present embodiment may be obtained by applying the negative active material mixture to the strip-like (elongated sheet-like) negative electrode metal foil 32 and then punching the negative electrode metal foil 32 in a punching process into the shape described above.

As shown in FIG. 1, the positive current collection terminal 40, which serves as a positive current collection member, is coupled to the positive current collector 28 (positive electrode tab 24). The positive current collection terminal 40 is electrically connected to the positive current collector 28. The positive current collection terminal 40 is also electrically connected to the positive terminal 15. The negative current collection terminal 41, which serves as a negative current collection member, is coupled to the negative current collector 38 (negative electrode tab 34). The negative current collection terminal 41 is electrically connected to the negative current collector 38. The negative current collection terminal 41 is also electrically connected to the negative terminal 16.

The operation of the rechargeable battery 10 of the present embodiment will now be described.

In the positive electrode sheet 21, the positive electrode border 26c is located toward the positive electrode lower edge 25, which serves as the second positive electrode edge, from the positive electrode upper edge 23, which serves as the first positive electrode edge and the positive electrode tab 24 is formed on. Thus, in the positive electrode sheet 21, the positive electrode non-application region 26b is formed on the positive electrode tab 24 and in the vicinity of the positive electrode upper edge 23 in the positive electrode metal foil 22.

For example, when the positive active material layer 26 (positive electrode application region 26a) is formed extending to the positive electrode upper edge 23 of the positive electrode metal foil 22, a processing error, which occurs during the application of the positive active material agent, may cause the positive active material layer 26 to extend to the positive electrode tab 24. In this case, the positive active material that is overspread from the positive electrode metal foil 22 becomes unnecessary. Such a problem may occur when manufacturing the positive electrode sheet 21 by applying the positive active material agent to the positive electrode metal foil 22 after the punching process and when manufacturing the positive electrode sheet 21 by performing the punching process on the positive electrode metal foil 22 after the positive active material layer 26 is formed.

Further, in this case, as viewed from a direction orthogonal to the direction along the surfaces of the positive electrode sheet 21 and the negative electrode sheet 31 in the electrode assembly 18, the positive active material layer 26 formed in the positive electrode tab 24 is also included in the negative electrode application region 36a of the negative electrode sheet 31. Thus, there is a need to upwardly expand the negative electrode metal foil 32 of the negative electrode sheet 31. When the positive electrode application region 26a of the positive electrode sheet 21 is not included in the negative electrode application region 36a of the negative electrode sheet 31 as viewed from the stacking direction, metallic lithium may be deposited around the negative electrode sheet 31.

In the present embodiment, the positive electrode metal foil 22 and the positive active material layer 26 do not exist sideward from (right side in the present embodiment) of the positive electrode tab 24 from the beginning. Therefore, in the negative electrode sheet 31, a portion (region) corresponding to a location beside the positive electrode tab 24 is substantially irrelevant to improving the battery capacity of the rechargeable battery 10. This decreases the energy density of the rechargeable battery 10.

However, in the rechargeable battery 10 of the present embodiment, in the positive electrode sheet 21, the positive electrode non-application region 26b is formed on the positive electrode tab 24 and in the vicinity of the positive electrode upper edge 23 of the positive electrode metal foil 22.

Therefore, in the present embodiment, when the positive active material layer 26 is formed on the positive electrode metal foil 22 that has undergone the punching process, the active material agent is not over-applied to beside the positive electrode tab 24. This saves the positive active material and improves the usage rate of the active material. In the same manner, in the present embodiment, when performing the punching process after the positive active material layer 26 is formed on the positive electrode metal foil 22, the positive active material layer 26 is not formed on a region that does not serve as the positive electrode sheet 21. This improves the usage rate of the active material. In the present embodiment, the employment of the structure described above limits the formation of a region in the negative electrode sheet 31 that does not correspond to the positive active material layer 26 (positive electrode non-application region 26b) in the positive electrode sheet 21. This improves the energy density.

The negative electrode border 36c in the negative electrode sheet 31 is located between the negative electrode upper edge 33, which includes the negative electrode tab 34, and the distal portion 34a of the negative electrode tab 34. Thus, in the negative electrode metal foil 32, the negative active material layer 36 includes the negative electrode upper edge 33. In the positive electrode sheet 21, with respect to the negative electrode sheet 31, the positive electrode border 26c of the positive active material layer 26 is located between the negative electrode border 36c and the negative electrode lower edge 35 and between the negative electrode upper edge 33 and the negative electrode lower edge 35. This allows the negative electrode upper edge 33 of the negative electrode sheet 31 to approach the positive electrode border 26c of the positive electrode sheet 21 within a range in which the negative electrode upper edge 33 of the negative electrode sheet 31 is not located toward the negative electrode lower edge 35 from the positive electrode border 26c in the positive electrode sheet 21. Accordingly, the negative electrode metal foil 32 used to form the negative electrode sheet 31 is reduced in size, and the energy density may be improved.

Accordingly, the present embodiment has the advantages described below.

(1) The upper edge 23 of the positive electrode sheet 21 includes the positive electrode tab 24. The surface of the positive electrode sheet 21 includes the positive electrode application region 26a that includes the positive electrode lower edge 25, which is located at the opposite side of the positive electrode upper edge 23. The positive active material is applied to the positive electrode application region 26a. In the positive electrode sheet 21, the positive electrode border 26c, which is the border between the positive electrode application region 26a and the positive electrode non-application region 26b, is located between the positive electrode upper edge 23 and the positive electrode lower edge 25. Therefore, the positive electrode non-application region 26b is formed on the positive electrode tab 24 and in the vicinity of the positive electrode upper edge 23 of the positive electrode metal foil 22. This inhibits the positive active material from entering the side of the positive electrode tab 24. Consequently, this saves the positive active material and improves a usage rate of the active material.

In the negative electrode sheet 31, the negative electrode border 36c, which is the border between the negative electrode application region 36a and the negative electrode non-application region 36b, is located between the negative electrode upper edge 33, which includes the negative electrode tab 34, and the distal portion 34a of the negative electrode tab 34. The positive electrode border 26c is located at a position corresponding to between the negative electrode upper edge 33 and the negative electrode lower edge 35, which is located at the opposite side of the negative electrode upper edge 33. This allows the negative electrode upper edge 33 of the negative electrode sheet 31 to approach the positive electrode border 26c of the positive electrode sheet 21 within a range in which the negative electrode upper edge 33 of the negative electrode sheet 31 is not located toward the negative electrode lower edge 35 from the positive electrode border 26c. Accordingly, the negative electrode metal foil 32 used to form the negative electrode sheet 31 is reduced in size, and the energy density is improved.

(2) The upper edge 19a of the separator 19 is located toward the distal portion 24a of the positive electrode tab 24 from the positive electrode upper edge 23 and toward the distal portion 34a of the negative electrode tab 34 from the negative electrode upper edge 33. This suitably ensures insulation between the positive electrode tab 24 and the negative electrode sheet 31 and between the negative electrode tab 34 and the positive electrode sheet 21.

(3) The usage rate of the active material in the rechargeable battery 10 and the energy density may be improved. Accordingly, the amount of electric power usable with a single full charge may be improved, and the rechargeable battery 10 may be miniaturized.

Embodiments are not limited to the foregoing description. For example, embodiments may be realized as follows.

Figure 4:
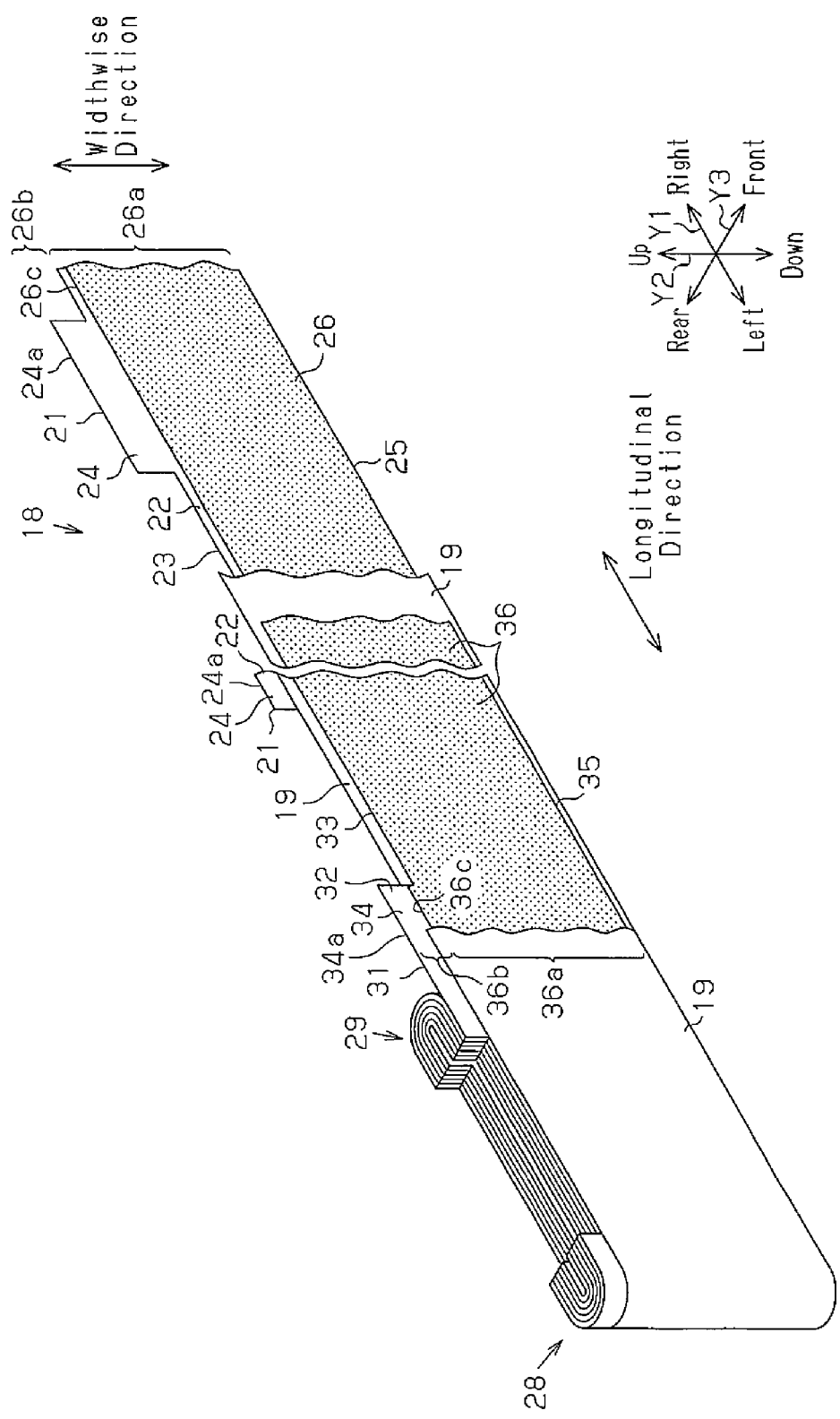
FIG. 4 is a schematic perspective view of an electrode assembly in another embodiment.

As shown in FIG. 4, the electrode assembly 18 may be formed in such a manner that the positive electrode sheet 21, the negative electrode sheet 31, and the separator 19 each form a strip-like (elongated sheet-like) shape, and the positive electrode sheet 21 and the negative electrode sheet 31, with the separator 19 arranged in between, are wound in a rolled manner so that the positive electrode sheet 21 and the negative electrode sheet 31 have a layered structure (lamination structure).

In this case, in the positive electrode upper edge 23 of the positive electrode sheet 21, the positive electrode tabs 24 each extend at a predetermined interval in the longitudinal direction of the positive electrode sheet 21. Also, in the negative electrode upper edge 33 of the negative electrode sheet 31, the negative electrode tabs 34 each extend at a predetermined interval in the longitudinal direction of the negative electrode sheet 31.

By winding and stacking the positive electrode sheet 21 and the negative electrode sheet 31, the positive current collector 28, which has a layered structure formed by stacking a plurality of the positive electrode tabs 24 without sandwiching the separator 19, upwardly extends at the left side of the upper edge in the electrode assembly 18.

The right side of the upper edge in the electrode assembly 18 includes the negative current collector 38, which has a layered structure formed by stacking a plurality of the negative electrode tabs 34 without sandwiching the separator 19.

In the same manner as the above embodiment, this structure saves the positive active material during the formation of the positive electrode sheet 21 and improves the usage rate of the active material. Further, this structure also limits the formation of a region in the negative electrode sheet 31 that does not correspond to the positive active material layer 26 (positive electrode application region 26a) in the positive electrode sheet 21 and improves the energy density.

In the negative electrode sheet 31, the length L1b from the negative electrode lower edge 35 to the negative electrode upper edge 33 may be less than the length L1a from the positive electrode lower edge 25 to the positive electrode upper edge 23 in the positive electrode sheet 21. In this case, however, the length L1b from the negative electrode lower edge 35 to the negative electrode upper edge 33 in the negative electrode sheet 31 is greater than the length L2a from the positive electrode lower edge 25 to the positive electrode border 26c in the positive electrode sheet 21.

In the negative electrode sheet 31, the length L2b from the negative electrode lower edge 35 to the negative electrode border 36c may be greater than the L6 of the separator 19 in the vertical direction. That is, a portion of the negative active material layer 36 may protrude in the perpendicular direction of the separator 19.

The positive electrode tab 24 may have a triangular shape that extends from the positive electrode upper edge 23 of the positive electrode metal foil 22. The negative electrode tab 34 may be modified in the same manner. In this case, the top of each of the triangular positive electrode tab 24 and the negative electrode tab 34 is the distal portion.

Each of the positive electrode tab 24 and the negative electrode tab 34 may be formed on a lateral edge or a lower edge of the electrode assembly 18.

The positive electrode metal foil 22 is used as the positive electrode thin metal plate, and the negative electrode metal foil 32 is used as the negative electrode thin metal plate. However, a thin plate that has sufficient thickness for maintaining the battery capacity (electric capacity) in the rechargeable battery 10 and has no influence when manufacturing the battery may be used as the positive electrode thin metal plate and the negative electrode thin metal plate.

The electrode assembly 18 may be formed by stacking the positive electrode sheet 21 and the negative electrode sheet 31, which are located on opposite sides of the separator 19 and folded into an accordion-like shape.

The number of the positive electrode sheets 21 and the negative electrode sheets 31, which form the electrode assembly 18, may be modified. For example, the electrode assembly 18 may include a single positive electrode sheet 21 and a single negative electrode sheet 31.

The shape of the case 11 may be cylindrical or elliptic cylindrical that is elongated in the lateral direction.

The rechargeable battery 10 of the above embodiment may be installed in a vehicle (for example, an industrial vehicle or a passenger vehicle). In this case, a compressor for the air conditioner, an electric motor used to drive the wheels, and electric components such as an automotive navigation system may be driven with electric power supplied from the rechargeable battery 10 as the rechargeable battery 10 is charged by a power generator installed in the vehicle. This improves the usage rate of the active material as the rechargeable battery 10 and the energy density, which, in turn, increases the amount of electric power that can be used with a single full charge and allows the rechargeable battery 10 to be reduced in size. Consequently, the recharge cycle of the vehicle may be prolonged, and the degree of freedom may be increased for the location where the rechargeable battery 10 is installed.

The present invention may be realized as an electric double-layer capacitor. That is, the present invention is applicable to a power storage device that has a structure capable of being charged and discharged.

The invention claimed is:

1. A power storage device comprising:
   a positive electrode sheet including a positive electrode thin metal plate, which includes a first positive electrode edge and a second positive electrode edge located at an opposite side of the first positive electrode edge, and a positive electrode tab, which extends from the first positive electrode edge in an extending direction;
   a positive current collection member connected to the positive electrode tab to be electrically connected to the positive electrode thin metal plate;
   a negative electrode sheet including a negative electrode thin metal plate, which includes a first negative electrode edge and a second negative electrode edge located at an opposite side of the first negative electrode edge, and a negative electrode tab, which extends from the first negative electrode edge in the extending direction;

a negative current collection member connected to the negative electrode tab to be electrically connected to the negative electrode thin metal plate;

a sheet-like separator arranged between the positive electrode sheet and the negative electrode sheet to insulate the positive electrode sheet and the negative electrode sheet from each other;

an electrode assembly formed by stacking the positive electrode sheet, the negative electrode sheet, and the separator; and a case accommodating the electrode assembly, wherein a surface of the positive electrode sheet includes a positive electrode application region, which includes the second positive electrode edge and to which a positive active material is applied, the surface of the positive electrode sheet includes a positive electrode non-application region, to which the positive active material is not applied, a positive electrode border, which is a border between the positive electrode application region and the positive electrode non-application region, is located between the first positive electrode edge and the second positive electrode edge, a surface of the negative electrode sheet includes a negative electrode application region, which includes the second negative electrode edge and to which a negative active material is applied, the surface of the negative electrode sheet includes a negative electrode non-application region, to which the negative active material is not applied, a negative electrode border, which is a border between the negative electrode application region and the negative electrode non-application region, is located between the first negative electrode edge and a distal portion of the negative electrode tab, the first negative electrode edge and the first positive electrode edge are located on the same side of the electrode assembly, a length from the first negative electrode edge to the second negative electrode edge is greater than a length from the first positive electrode edge to the second positive electrode edge, and the positive electrode border is located between the first negative electrode edge and the second negative electrode edge.

2. The power storage device according to claim 1, wherein the separator includes an edge that is located on the same side as the first positive electrode edge and the first negative electrode edge in the electrode assembly, and the edge of the separator is located toward a distal portion of the positive electrode tab from the first positive electrode edge and is also located toward the distal portion of the negative electrode tab from the first negative electrode edge.

3. The power storage device according to claim 1, wherein in the positive electrode sheet, a length from the second positive electrode edge to the first positive electrode edge is greater than a length from the second positive electrode edge to the positive electrode border, and in the negative electrode sheet, a length from the second negative electrode edge to the first negative electrode edge is less than a length from the second negative electrode edge to the negative electrode border.

4. The power storage device according to claim 1, wherein the positive electrode application region of the positive electrode sheet is entirely included in the negative electrode application region of the negative electrode sheet as viewed from a stacking direction.

5. The power storage device according to claim 1, wherein the positive electrode non-application region is located in the entire positive electrode tab and proximate to the first positive electrode edge, and the negative electrode non-application region is located in a portion of the negative electrode tab including the distal portion of the negative electrode tab.

6. The power storage device according to claim 1, wherein a length along a surface of the positive electrode thin metal plate in a direction orthogonal to an extending direction of the positive electrode tab is less than a length along a surface of the negative electrode thin metal plate in a direction orthogonal to an extending direction of the negative electrode tab.

7. The power storage device according to claim 1, wherein the length from the first positive electrode edge to the second positive electrode edge is less than a transverse width of the positive electrode sheet.

8. The power storage device according to claim 7, wherein the length from the first negative electrode edge to the second negative electrode edge is less than a transverse width of the negative electrode sheet.

9. The power storage device according to claim 1, wherein the length from the first negative electrode edge to the second negative electrode edge is less than a transverse width of the negative electrode sheet.

10. A vehicle to which a the power storage device according to claim 1 is installed.

11. A power storage device comprising:

a case;

a positive electrode sheet comprising a metal plate, and a positive electrode tab extending in an extending direction;

a negative electrode sheet comprising a metal plate, and a negative electrode tab extending in the extending direction;

a separator arranged between the positive electrode sheet and the negative electrode sheet to insulate the positive electrode sheet and the negative electrode sheet;

a positive current collection member connected to the positive electrode tab; and a negative current collection member connected to the negative electrode tab;

wherein a surface of the positive electrode sheet includes a positive electrode application region with positive electrode active material that covers only a portion of the metal plate, and not any portion of the positive electrode tab;

wherein a surface of the negative electrode sheet includes a negative electrode application region with negative electrode active material that covers an entire surface of the metal plate and a portion of the negative electrode tab, and the negative electrode tab includes an additional portion that does not include negative electrode active material;

wherein the positive electrode sheet has a first length that extends from one side of the metal plate to another, parallel to a direction along which the positive electrode tab extends from;

wherein the negative electrode sheet has a second length that extends from one side of the metal plate to another, parallel to a direction along which the negative electrode tab extends from;

the first length is less than the second length, and wherein the positive electrode application region with positive electrode active material does not extend beyond the second length.

12. The power storage device according to claim 11, wherein the first length is less than a transverse width of the positive electrode sheet.

13. The power storage device according to claim 12, wherein the second length is less than a transverse width of the negative electrode sheet.

14. The power storage device according to claim 11, wherein the second length is less than a transverse width of the negative electrode sheet.

* * * * *